Feb. 4, 1964
S. L. KOUTZ ET AL
3,120,471
NEUTRONIC REACTOR
Original Filed June 25, 1958
4 Sheets-Sheet 3
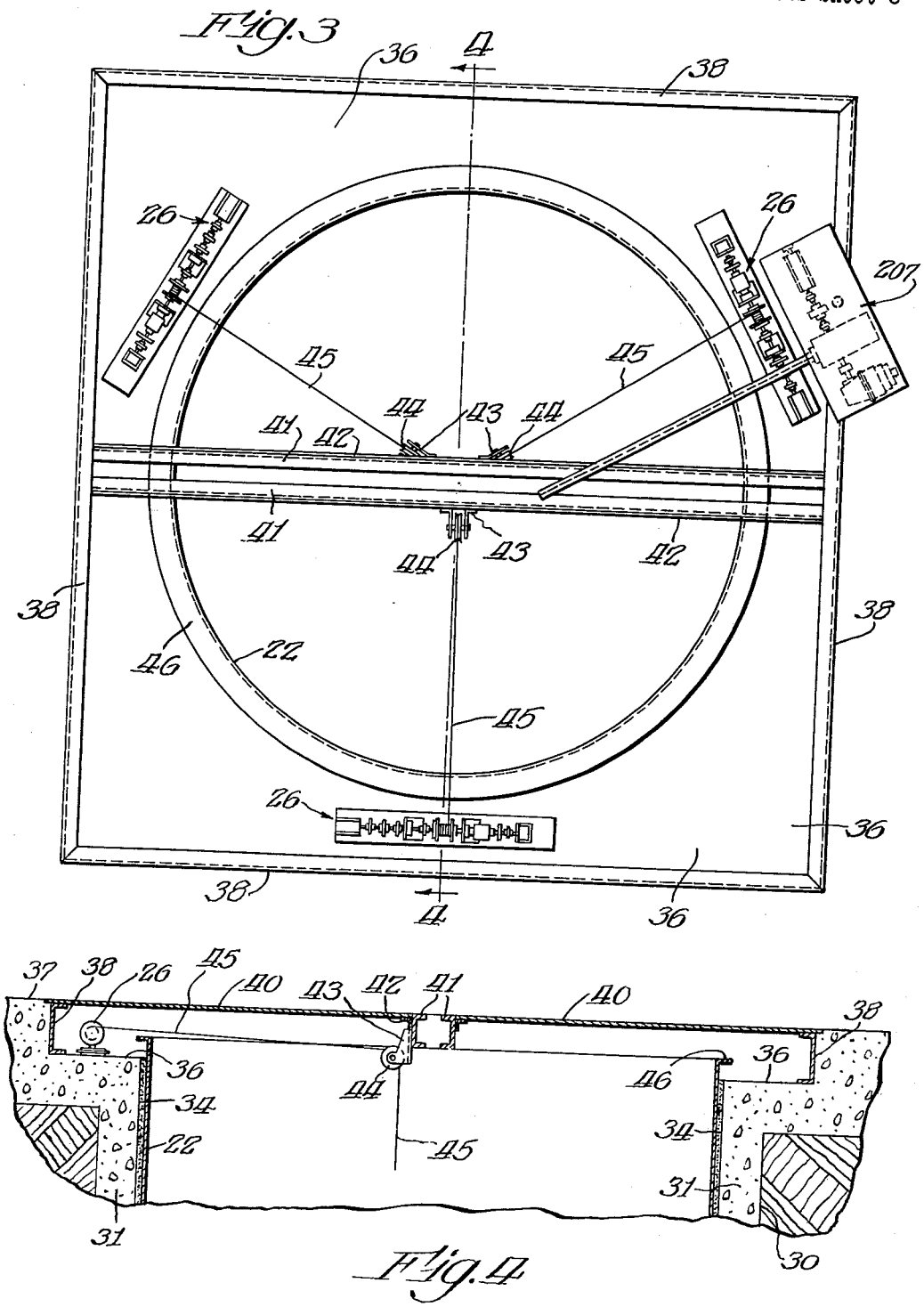

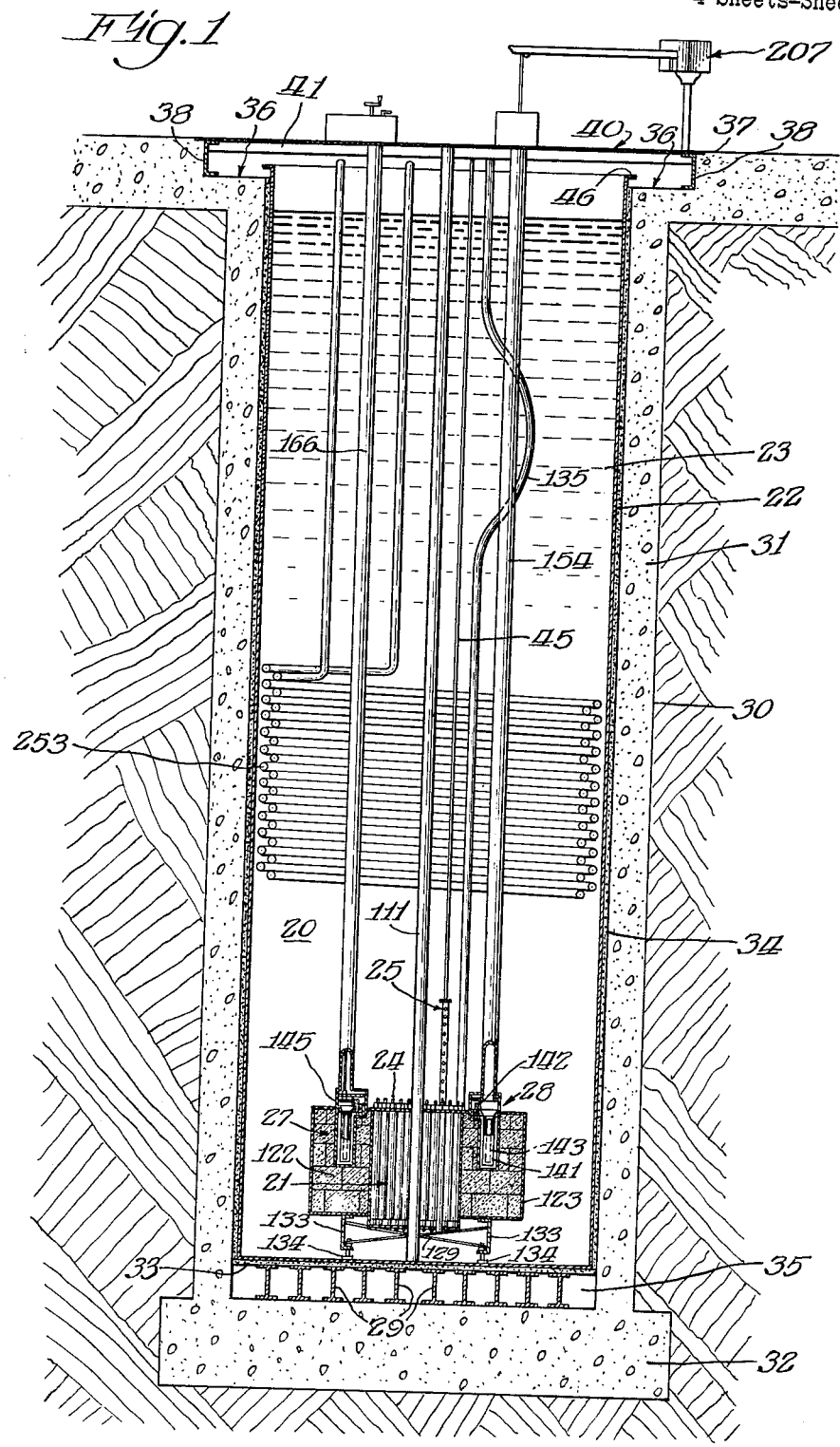

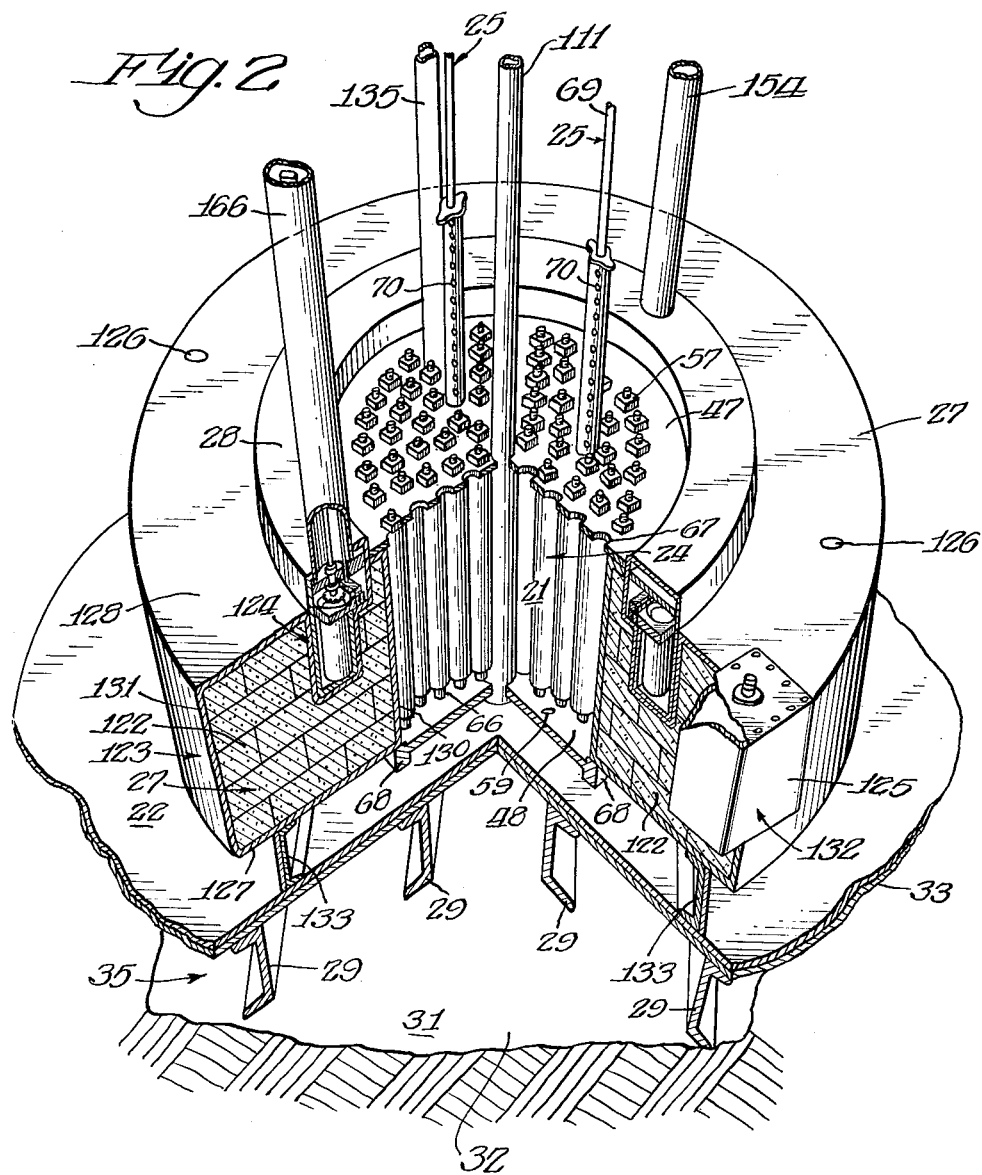

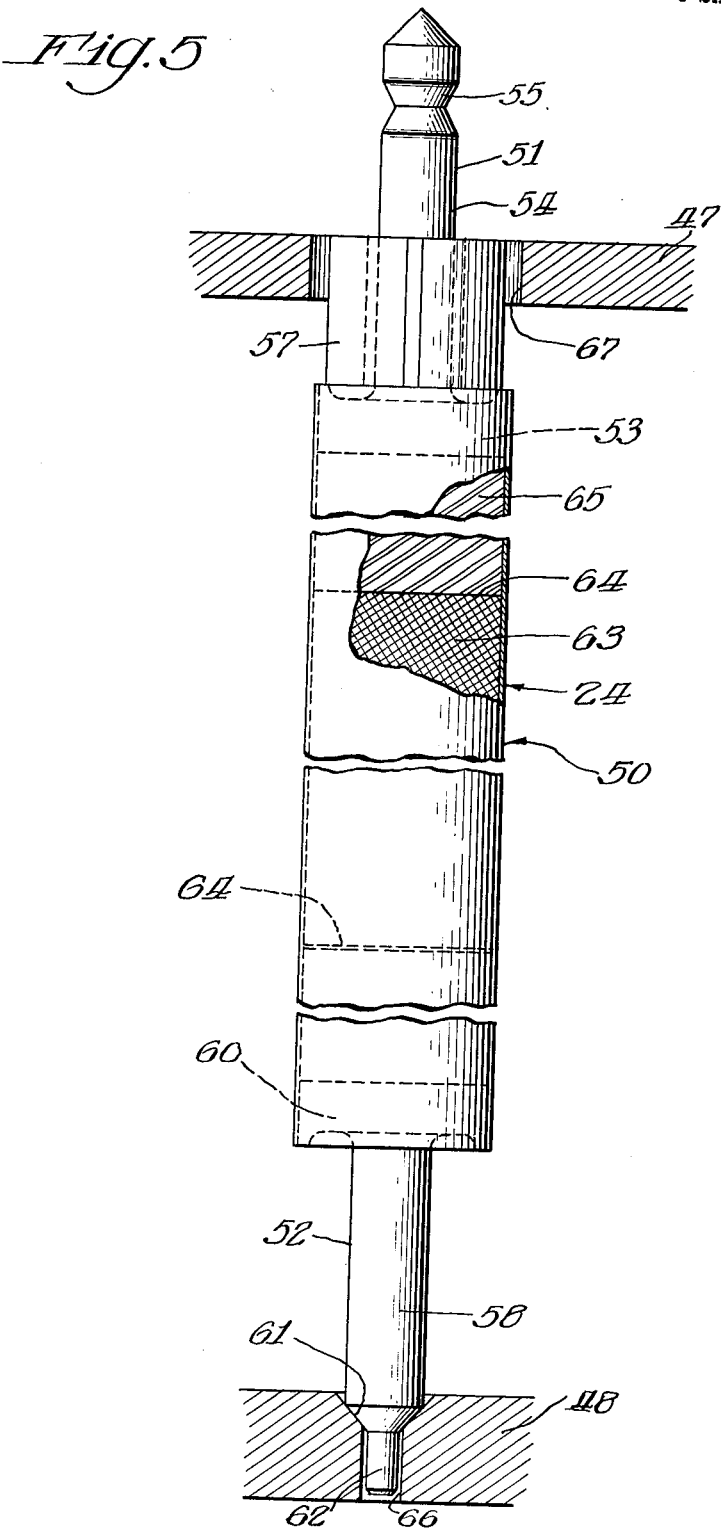

United States Patent Office 3,120,471
Patented Feb. 4, 1964

3,120,471
NEUTRONIC REACTOR
Stanley L. Koutz, San Diego, Robert B. Duffield, La Jolla, Robert B. Minogue and Harvey P. Sleeper, Jr., Solana Beach, and Melvin Frankel, Los Angeles, Calif., assignors to General Dynamics Corporation, New York, N.Y., a corporation of Delaware
Original application June 25, 1958, Ser. No. 744,364, now Patent No. 3,072,549, dated Jan. 8, 1963. Divided and this application July 6, 1959, Ser. No. 825,089
2 Claims. (Cl. 176—62)

The present invention relates generally to neutronic reactors and more particularly to an improved fluid-cooled neutronic reactor.

It is desirable that a reactor be inherently safe so that it may be used by persons who are not reactor experts without fear of a major accident. In this connection, if the reactor is operated at a good power level, if an unexpected increase or surge in neutron multiplication occurs, the reactor is preferably designed so that the only result which occurs is a rise in the power level to a higher but still non-dangerous level. The present invention provides a relatively simple, inexpensive and safe neutronic reactor suitable for use on the premises of a utilizing organization.

A neutronic reactor generally includes an active core containing a moderator and some form of fuel which contains or is formed of fissionable material, a reflector to conserve escaping neutrons, control and measuring elements, some form of provision for heat removal, and suitable shielding. In a neutronic reactor, fast neutrons are produced in the fission process. These neutrons may suffer scattering collisions, mainly elastic, as a result of which their energy is decreased; they may be absorbed by the various materials present in the system; or, they may escape. Depending upon the relative amounts and nature of the fuel, moderator, reflector and other substances, their geometrical arrangement and the dimensions of the system, the major portion of the neutron captures leading to fission will take place in a certain energy range. If most of the fissions result from the capture of thermal neutrons, the system is referred to as a "thermal reactor"; if most of the fission processes are due to absorption of neutrons of an energy in an intermediate range, the system is referred to as an "intermediate reactor"; and finally, if the main source of fissions is caused by the capture of fast neutrons, the system is referred to as a "fast reactor." A detailed description of the theory and practice of the design, construction and operation of reactors generally is set forth in various patents and books, and will therefore not be referred to in detail herein. For example, see "The Elements of Nuclear Theory," by Glasstone and Edlund, published 1952, by Van Nostrand Company, Inc.

To sustain a chain reaction, each nucleus in the reactor which captures a neutron and undergoes fission must produce, on the average, at least one neutron which causes fission of another nucleus in the reactor. It has been found convenient to express this condition in terms of an effective multiplication or reproduction factor $K_{eff}$, defined as the ratio of the number of neutrons produced by fission in each generation to the number of neutrons present in the preceding generation. The critical condition is that $K_{eff}$ shall be exactly unity. When $K_{eff}$ is equal to one, a chain reaction will be maintained at a constant rate of fission and power level. If $K_{eff}$ for a reactor exceeds one, the system is said to be super-critical, and, if less than one, the system is said to be sub-critical.

In discussing the characteristics of a neutronic reactor, it is convenient to introduce a further quantity $\rho$, called the reactivity, defined by the relationship $$\rho = \frac{K_{eff}-1}{K_{eff}}$$

Reactors may also be classified according to the physical condition of the fuel, as either a "heterogeneous reactor" or as a "homogeneous reactor." In a "heterogeneous reactor" bodies of fissionable material or fuel are distributed or arranged in a pattern throughout the moderator. The fuel is generally in the form of discrete lumps which are surrounded by moderator material. In a "homogeneous reactor," the fissionable material and the moderator are combined in a mixture, such that an effective homogeneous medium is presented to the neutrons. Such a mixture may be either a solution of fuel and moderator or a solid mixture of particles of the fuel and of the moderator.

It is a primary object of the present invention to provide an inherently safe neutronic reactor which will not become damaged by a surge in neutron multiplication. Another object is to provide an inexpensive and safe neutronic reactor which can be successfully operated with a minimum of supervision by relatively unskilled personnel.

A further object of the present invention is to provide an improved means for cooling the core of a reactor.

Additional objects and advantages of the present invention will be apparent from a study of the following detailed description and from the accompanying drawings.

In the drawings:

FIGURE 1 is a sectional view of a reactor constructed in accordance with the present invention;

FIGURE 2 is an enlarged perspective view of the core and reflector portion of the reactor shown in FIGURE 1 with a portion thereof cut away to show part of the interior construction;

FIGURE 3 is an enlarged top plan view of the reactor shown in FIGURE 1 with the cover members of the reactor removed;

FIGURE 4 is a partial sectional view taken along the line 4—4 of FIGURE 3; and

FIGURE 5 is an enlarged elevational view partially in section of one of the fuel elements shown in FIGURES 1 and 2.

The present invention is illustrated in connection with a reactor which is adapted for producing radioactive isotopes. The isotope-producing facilities form the subject of application Serial No. 744,364, filed June 25, 1958, now U.S. Patent No. 3,072,549, issued January 8, 1963, and owned by the assignee of this invention.

The illustrated reactor includes a reactive core, a reflector extending about the core, a movable member or specimen rack in the reactor for supporting a plurality of specimens to be irradiated, means for removing a specimen from the specimen rack at a predetermined position in the reactor, and means for moving the specimen within the specimen rack in the predetermined position. While many different types of reactors may be utilized for purposes of this invention, it is preferred, but not essential, that the reactor core be located in a tank which is disposed within a pit in the ground, so that effective shielding against radiation may be afforded in an economical manner, without resorting to expensive above-the-ground shielding structures. The tank is filled with a suitable liquid such as water which serves as a moderator, coolant and shielding. Cooling means may be provided for the fluid within the tank for regulating the temperature of the core.

Other radiation facilities in addition to the movable specimen rack may be provided in the reflector and/or core for irradiating various sizes and shapes of specimens at various radiation intensity levels. Suitable pickup means are furnished to remove the specimens from the reactor while it is in operation. Also furnished in the reactor is an improved control system for regulating the power level of the reactor.

The core of the reactor may be of any suitable construction. However, it is preferable if the core is designed so that the reactor is inherently safe, i.e., it will not be damaged by an unexpected and sudden surge in neutron multiplication. In the illustrated embodiment, the core of the reactor is designed, in combination with the remaining components of the reactor, to have a high prompt negative temperature coefficient of reactivity, hereinafter explained in greater detail. This is responsible for the great safety of the present reactor during its operation.

The worst conceivable mishandling of the reactor consists of suddenly introducing all or a major portion of the available excess reactivity into the reactor. Such excess reactivity is the margin of reactivity increase available in the reactor to overcome conditions which would decrease the reactivity below that necessary for merely sustaining the chain reaction. If the reactivity of the reactor decreases with increasing temperature, it is said to have a negative temperature coefficient of reactivity.

The reactor in order to be safe is constructed so that a sudden addition of excess reactivity will not damage the reactor. This is accomplished by constructing the reactor so that it has a sufficiently prompt negative temperature coefficient of reactivity. By a "prompt" temperature coefficient is meant one which does not require the flow of heat from one region to another in order for it to come into play.

The neutrons within a reactor quickly attain equilibrium with the moderating material. Although the adjustment of the neutron temperature to the temperature of the moderator occurs very rapidly, and for our purposes may be considered as occurring essentially instantaneously, the response of the moderator temperature to the reactor power level is not necessarily fast. Indeed, in a "heterogeneous" reactor in which the fuel elements are distributed in a definite pattern in the moderator, the response is quite slow, because the independent heat-transfer behavior of the fuel and moderator causes a lag between the induced heat transient in the fuel and the dampening effect of a general temperature rise in the entire core. This lag can result in a melt-down of the fuel or even an explosion of the reactor. On the other hand, in a "homogeneous" reactor, in which the fuel material is more or less evenly dispersed throughout the moderator, the response is essentially instantaneous. In the present reactor we take advantage of this latter characteristic by forming fuel elements which include a homogeneous mixture of a solid moderator and a material fissionable by neutrons of thermal energy such as uranium 235, uranium 233 or plutonium 239.

The desired high prompt negative temperature coefficient of reactivity is obtained by designing the reactor core in accordance with the principles set forth in United States application Serial No. 732,415, by Taylor, McReynolds and Dyson, and entitled "Neutronic Reactor."

In this type of core, a significant contribution to the negative temperature coefficient of the reactivity is obtained from the "fuel element expansion" effect, the "warm neutron" effect, the "leakage" effect and the "neutron Doppler" effect. A further contribution to the negative temperature coefficient of reactivity may be obtained by the controlled use of "poisons" in the reactor.

If the reactivity of the reactor is increased the power level of the reactor will rise, causing the fuel elements to become hotter. As the temperature of the fuel elements increases the fuel element will expand in size, forcing a portion of the cooling water to leave the core of the reactor thereby decreasing the hydrogen density in the core. This will result in an increased leakage of fast neutrons from the core and a decreasing reactivity of the system. This effect is referred to as the "fuel element expansion" effect.

The "warm neutron effect" and "leakage effect" operate in the following manner: Suppose the reactivity of the reactor is suddenly increased. Then the fuel and the internal moderator, i.e., the solid moderator which is intimately intermixed with the fuel, becomes hotter and the neutrons within the fuel element are thereby warmed up. Because of the rise of the average neutron energy, the fission cross section of the fuel is decreased, resulting in a decreased absorption of neutrons in the fuel. A larger proportion of the neutrons escape from the fuel element into the external moderator and a smaller proportion are available for fission. On the other hand, the neutrons which do arrive in the external moderator are rapidly cooled and are then absorbed with a fixed probability independent of the fuel temperature. The differential absorption of neutrons is referred to as the "warm neutron effect." The increased leakage of neutrons from the core and reflector is referred to as the "leakage effect." The net effect is that a higher proportion of neutrons are captured in the external moderator or pass out of the system, and the reactivity of the system is lowered.

By including in the homogeneous mixture of the fuel elements a suitable amount of material having a large number of strong, narrow resonance bands at energies above thermal, one can effect a further significant contribution to the prompt negative temperature coefficient of reactivity. Because the kinetic energy of the nuclei increases with increasing temperature, the width of each of the resonance bands increases with temperature. Since the resonance absorption cross sections are large, essentially all of the neutrons having energies which fall within the widths of the various individual resonance bands in the resonance region are captured. The widening of the resonance bands therefore results in a decrease in the resonance escape probability, notwithstanding the fact that the heights of the resonance peaks are somewhat decreased. The broadening of the resonance bands is generally referred to as the "neutron Doppler effect." While the "neutron Doppler effect" itself is well known, it has been believed that this effect could not provide a sufficient contribution to the temperature coefficient of reactivity in a reactor to play a substantial role in the construction of a safe reactor. We have now found that when a sufficient amount of material having a large number of strong resonance bands at energies above thermal is uniformly dispersed within the fuel elements of a solid "homogeneous" type reactor, so that the amount of resonance absorption is greater than about 3 percent, there will be a significant "Doppler" contribution to the negative temperature coefficient of reactivity of the reactor.

The reactor may also include a material having a high neutron capture cross section distributed in the reactor in a manner such that the absorption of neutrons by this material relative to the absorption of neutrons by the fissionable material increases with increasing temperature. Since the fission cross section of uranium decreases uniformly with neutron temperature, this may be accomplished by the homogeneous distribution of an absorber such as cadmium or samarium for which the capture cross section increases with neutron temperature because of nearby resonances. It may also be accomplished by the distribution of any strong absorber in individual amounts sufficient to be essentially opaque to thermal neutrons, thus giving absorption independent of neutron temperature. Such materials may be termed "poisons" and may be added either to the fuel element or to the reflector. We have discovered that a moderate amount of "poison" may be used in a reactor without requiring an unduly large increase in the amount of fuel or size and cost of the reactor, while at the same time providing a large contribution to the prompt negative temperature coefficient of the reactor.

We have further discovered that the excess reactivity required in the reactor may be decreased by including a suitable amount of a "burnable poison" such as samarium oxide in the reactor. The amount of "burnable poison" in the reactor preferably should be such that its rate of consumption as far as possible balances the rate of consumption of fissionable material and build-up of fission product poisons during operation of the reactor, thereby prolonging the useful life of the fuel elements.

Other effects which contribute to the negative temperature coefficient of reactivity will also be present in the reactor. However, such other effects do not play an important part in the design of the present reactor. We may include in these further effects the temperature coefficient of coolant expansion, and the effect of neutron temperature on the capture-to-fission ratio of fuel. Since these effects are relatively minor in nature, they will not be further discussed. Complete information on these effects may be obtained from the literature on the reactor theory.

A reactor must have sufficient excess reactivity to overcome the decrease in reactivity due to build-up of "poisons" and fuel burn-up during operation of the reactor, due to neutron absorption by samples being irradiated during operation of the reactor, and due to the increase in temperature during operation of the reactor. For example, the excess reactivity of the reactor may total about .005. In this case the fuel elements of the reactor would include an amount of fissionable material which provides an excess reactivity of at least .005 at the operating temperature of the reactor.

The particular reactor, as illustrated, is designed to operate at a power level of up to about 10 kilowatts at a normal operating fuel temperature of about 40° C. At the 10-kilowatt power level the neutronic reactor illustrated provides an average neutron flux of about $7 \times 10^{11}$ neutrons per square centimeter per second at the specimen rack located in the reflector.

It has been found that a reactor constructed in accordance with the present invention and having a 10 kilowatt power level has sufficient power to produce most of the radioactive isotopes which would be useful to present-day industry. It should be noted that reactors can be constructed in accordance with the principles of the present invention so as to provide much higher power levels and have much higher excess reactivities than are provided by the 10 kilowatt reactor illustrated.

Now referring more particularly to the reactor illustrated in the drawings, the reactor, designated by the reference numeral 20, includes a core 21 disposed near the bottom of a reactor tank 22 which is filled with a liquid 23. The core 21 includes a plurality of fuel elements 24. Disposed in the core 21 are control rod assemblies 25 which are operated by suitable winch mechanisms 26 located above the reactor tank 22. A reflector 27 encircles the core 21. Various irradiation facilities including a movable specimen rack 28 are provided in the core 21 and reflector 27, for irradiating specimens at preselected radiation levels.

Reactor tank 22 is located in a generally cylindrical pit 30. The pit 30 may be constructed by standard construction methods, with the hole lined with concrete, steel or other strong reinforcing material. In the particular assembly illustrated, the lining 31 of the hole is concrete. The depth of the reactor tank 22 is controlled by the amount of liquid shielding desired above the reactor core 21 which is within the tank 22. The width of the reactor tank 22 is controlled by the diameter of the reactor core 21, the size of the reflector 27 and the shielding required to reduce the neutron activity to a desired value at the boundary of the tank. Reactor tank 22 is preferably constructed of a material having a low neutron capture cross section. Since the reactor tank 22 is designed to contain liquid such as water, aluminum is preferred in order to minimize corrosion problems and to also reduce costs of construction. Reactor tank 22 is cylindrical in form with an open top of suitable dimensions to fit inside the pit 30. The bottom of reactor tank 22 is supported in position above a horizontally extending concrete base 32 which forms the bottom of pit 30. The bottom of the tank 22 rests on a platform comprising a flat, generally circular plate 33 preferably of aluminum. The plate 33 in turn is supported on a series of horizontal aluminum beams 29. A porous fill, such as gravel, is placed in an annular space 34 between the wall of the reactor tank 22 and the wall of the pit 30. Any water which may leak into the annular space 34, either from the reactor tank 22 or inwardly from the outside of the concrete lining 31, is collected in a space 35 at the bottom of the pit 30. A suction line (not shown) may be run down through the annular space 34 to remove any water which may collect.

Reactor tank 22 is disposed within the ground in the described manner so that the ground itself acts as a natural protective shielding means for the reactor. Accordingly, construction costs are reduced, since expensive above-the-ground shielding structures are obviated.

A horizontal shelf 36 is preferably provided at the upper end of the pit 30 for the mounting of the control rod winch mechanisms 26, described subsequently. The outer perimeter of the shelf 36 is illustrated as being substantially square, however, the specific contour of the perimeter of the shelf is unimportant. The surface of the shelf 36 is at a sufficient depth from floor level 37 to accommodate the height of the winch mechanisms 26. A channel 38 may be attached to the concrete at each edge of the perimeter of the shelf 36 for support of a two section cover 40 over the pit 30. If desired, a grate may be used for the cover 40 so that the reactor can be visually observed during operation.

Two substantially parallel, closely spaced channels 41 extend generally diametrically across the top of the tank 22. An angle 42 welded to each of these channels 41 furnishes support for the inner edge of each section of the cover 40. Suitable brackets 43 are attached to the channels 41 and support a plurality of sheaves 44. A cable 45 runs substantially horizontally from each of the winch mechanisms 26 to the adjacent sheave 44, and thence generally vertically to an associated control rod assembly 25.

The reactor tank 22 includes an upper horizontally extending rim or flange 46 which is above the shelf 36 but below floor level 37 so as to allow free passage of the cables 45 between the rim 46 and the cover 40.

The reactor tank 22 is filled with a suitable liquid 23 which acts as a moderator, coolant and shield for the reactor. For these purposes either ordinary or heavy water is acceptable.

Ordinarily, sixteen feet of ordinary water over the core 21 provides adequate shielding of the reactor radiation. Using water as a shield permits one to remove specimens from the reactor and visually observe the core 21 and control rod assemblies 25 during reactor operation. It should be noted that the depth of the reactor pit 30 may be reduced by reducing the amount of shielding liquid 23. However, a large reduction in depth would probably necessitate the placing of a supplementary lead or steel gamma shield over the top of the pit 30.

The water 23 that is used in the reactor tank 22 should be substantially free of impurities; otherwise, the activation of these impurities may be a hazard to operating personnel. Even though the water 23 used initially is distilled, impurities, such as products of corrosion, possible fuel element failure, foreign matter inadvertently dropped into the water, etc., may be introduced. To remove these a demineralizer (not shown) and a filter may be provided.

All of the various structural members disposed within the reactor tank are preferably formed of non-corrodible, mutually compatible materials having a low neutron capture cross section, such as aluminum or stainless steel.

Within the lower portion of reactor tank 22 is located the core 21 which is in the general form of a right circular cylinder and comprises a lattice of generally vertically extending fuel elements 24 held in spaced relation by upper and lower grid plates 47 and 48 respectively (see FIGURE 2).

Referring to FIGURE 5, each of the fuel elements 24 is formed of an elongated, closed cylindrical tube or body 50. The ends of the tube 50 are provided with top and bottom end fixtures 51 and 52 respectively which are welded tightly to the tube 50. The top end fixture 51 includes a lower cylindrical portion 53 which is inserted into and welded to the upper end of the cylindrical tube 50 and a central, upwardly extending elongated cylindrical projection 54 which has an annular groove 55 near the upper end thereof. The groove 55 is engageable by a coacting lifting assembly for vertically removing the fuel element 24 from the reactor core 21. A spacer 57 which encircles and is fixedly secured, as by pinning, to the lower end of the projection 54 provides passages for the flow of liquid 23 through the upper grid plate 47 while at the same time preventing the upper end of the fuel element 24 from wobbling. The spacer 57 has a transverse cross section of an equilateral triangle with rounded corners.

The bottom end fixture 52 includes an upper cylindrical portion 60 which is inserted into and welded to the tube 50, and a central, downwardly extending cylindrical projection 58. An inwardly tapered shoulder 61 is provided adjacent the lower end of the cylindrical projection 58 which supports the weight of the fuel element 24 on the lower grid plate 48 when it is in operating position. The cylindrical projection 58 includes a lower end portion 62 of reduced diameter below the tapered shoulder 61 which guides the fuel element 24 into operating position in the core 21.

The center portion of the cylindrical tube or body 50 of each fuel element 24 is filled with a solid central body 63 comprising a homogeneous mixture of a material fissionable by neutrons of thermal energy, such as uranium 233, uranium 235 or plutonium 239, a solid moderator, such as zirconium hydride, beryllium, beryllium oxide or graphite, and a material having a large number of strong resonance bands at energies above thermal, such as uranium 238 or thorium 232. Each fuel element 24 also preferably contains a "burnable poison," such as samarium oxide. This "poison" may be in the form of samarium oxide-aluminum wafers 64 which are placed at each end of the central body 63 of the fuel element 24.

The upper and lower portions of the cylindrical tube or body 50 of the fuel element 24 preferably contain suitable reflecting and moderating material 65 such as beryllium, beryllium oxide or graphite.

One particularly satisfactory fuel element 24 for use in the specific reactor, which is described herein, was formed with an active portion approximately 1.42 inches in diameter and 14 inches long comprising a uranium-zirconium hydride alloy containing 8 weight percent of uranium enriched to approximately 20 percent in uranium 235 and 92 weight percent of zirconium hydride, in which the hydrogen atom to zirconium atom ratio was about 1.0. Approximately four inches of graphite was included at each end of the fuel elements. Fifty-six of such fuel elements were included in the core.

As seen in FIGURES 1 and 2, the fuel elements 24 in the core 21 extend in a generally vertical direction and are generally uniformly spaced in concentric circles. The illustrated reactor provides positions for eighty-six fuel elements 24. The unused positions are occupied by dummy elements which are generally similar in outer construction to the fuel elements 24. The dummy elements are essentially completely filled with a suitable reflecting material such as graphite. It should be understood that the number of fuel elements 24 as compared to the dummy elements will vary considerably, depending upon the general design and dimensions of the reactor and particular arrangement of the fuel elements 24.

Fuel elements 24 are maintained in suitable spaced relation, as heretofore indicated, within the reactor core 21 by means of the pair of vertically spaced, transversely extending perforated grid plates 47 and 48. The grid plates 47 and 48 are spaced apart within the reactor so that when the tapered shoulder 61 of each fuel element 24 rests on the lower grid plate 48, the upper grid plate 47 is located intermediate the spacer 57 of the fuel element 24.

The lower grid plate 48 has a plurality of circular holes 66 extending therethrough (see FIGURE 5), which have their centers on concentric circles and which are suitably countersunk to slidably engage the tapered shoulders 61 of the bottom end fixtures 52 of the fuel elements 24. These holes 66 are spaced so that when the core 21 is assembled approximately 35 percent of the core volume will be made up of water. The lower grid plate 48 also includes a plurality of spaced holes 59 (see FIGURE 2) which permit water to flow into the core 21 during operation of the reactor.

The upper grid plate 47 also has a plurality of circular holes 67 extending therethrough which are aligned with the holes 66 in the lower grid plate 48. The diameter of the holes 67 in the upper grid plate 47 are made so as to slidably accommodate the spacers 57 of the fuel elements 24. As may be seen in FIGURE 5, the diameter of the tubular body 50 of the fuel element 24 is slightly less than the diameter of the holes 67 so as to permit the fuel elements 24 to slide easily through the holes 67. All of the weight of the fuel elements 24 is supported by the lower grid plate 48 with the upper grid plate 47 only acting to position the upper portions of the fuel elements 24.

The grid plates 47 and 48, illustrated, have substantially circular outlines. The lower grid plate 48 is made slightly smaller in diameter than the internal diameter of the reflector 27 (described subsequently) and rests on suitably located angled spacers 68 which extend downwardly and inwardly from the lower surface of the reflector 27. The upper grid plate 47 is made slightly larger in diameter than the internal diameter of the reflector 27 and rests on suitably located spacers (not shown) attached to the upper surface of the reflector 27. Each of the grid plates 47 and 48 has ninety-one holes drilled therein, eighty-six of which may be used in the disclosed embodiment as fuel element positions. As described previously, the dummy fuel elements are inserted in the unused fuel element positions. Generally, the fuel elements 24 are placed near the center of the core 21 and the dummy elements are placed towards the outside of the core 21. The remaining holes 67 are used for control rod assemblies 25 and irradiation tubes. The number of control rod assemblies 25 and irradiation tubes may vary depending on the reactor design.

Control rods are generally provided in a reactor for starting up the reactor, operating it at some desired condition, and shutting it down when desired. Ordinarily, material having a large capture cross section for thermal neutrons, such as cadmium, boron, or boron carbide, is fabricated into rods which are easily moved in or out of the reactor. Moving a control rod into the core of the reactor reduces the reactivity of the reactor, conversely, moving a control rod out of the core of the reactor increases the reactivity of the reactor. A control rod may be rated according to the reduction of reactivity that occurs when it is fully inserted into a reactor.

In the illustrated embodiment, three symmetrically positioned control rod assemblies 25 are provided. Each of these control rod assemblies 25 includes a control rod which is designed to perform a different function in the reactor so as to achieve both range and accuracy of control. A so-called shim safety rod is used for coarse control of the reactor. The shim safety rod has a fairly large reactivity equivalent. A regulating rod having a smaller reactivity equivalent is provided for fine control of the reactivity. The shim safety rod and the regulating rod each have a reactivity equivalent great enough to shut down the reactor. A third rod having a large reactivity equivalent which may be equal to that of the shim safety rod is used as a safety rod. It has a large enough reactivity equivalent to shut the reactor down and is used to shut down the reactor quickly in the event of an emergency.

In the illustrated embodiment, the three control rod assemblies 25 are similar in construction, only varying by the amount of absorption material contained therein. Referring to FIGURE 2, the control rod assemblies 25 each include a control rod 69 which encloses suitable neutron absorption material, such as boron carbide, and which slides within an outer aluminum guide tube 70. The control rod assemblies 25 are symmetrically supported in the reactor core 21 by the upper grid plate 47, and held from wobbling by the lower grid plate 48.

Each guide tube 70 is inserted and fixedly positioned in a hole 67 in the upper grid plate 47 and includes a lower end portion of reduced diameter which extends into an aligned hole 66 in the lower grid plate 48. The guide tubes 70 are perforated to permit the liquid coolant (water) 23 to pass freely through their walls and extend above the core 21 to a sufficient height to allow the lower end of the control rod 69 to be completely withdrawn from the core 21.

While the center of the core 21 may be provided with a control rod assembly 25, in the illustrated embodiment, a tubular irradiation thimble 111 is run vertically through an enlarged central hole in the lower grid plate 48, through the central hole of the upper grid plate 47 and through the reactor tank 22 to the top thereof where it is securely attached to the channels 41. This thimble or "glory hole" 111 is at a point of maximum neutron flux in the reactor. The thimble 111 is useful for isotope production, pile oscillation experiments, and danger-coefficient experiments.

In the illustrated embodiment, each of the control rods 69 is moved in and out of the reactor core 21 by the winch mechanism 26. However, it should be noted that other means may be used for this purpose.

The core 21 is centrally located with respect to the reflector 27. Any material having good scattering properties and a low neutron absorption cross section, such as graphite, beryllium or beryllium oxide, can be used to construct the reflector 27. In the illustrated embodiment a plurality of suitably shaped graphite blocks 122 are used. The reflector 27 is substantially cylindrically shaped with a hollow circular center and is completely encased in a water-tight can 123.

The diameter of the reactor tank 22 is made substantially larger than the outer diameter of the reflector 27 to provide an annular space between the reactor tank 22 and the reflector 27. This space, when filled with water, increases the neutron flux available in the reflector 27, while using the minimum possible size reflector 27. In addition, this annular space facilitates the installation and removal of the reflector assembly 27.

The graphite blocks 122 are encased in the water-tight can 123 so as to prevent water from entering the reflector material and decreasing the reactivity of the reactor. Suitable recesses 124, 125 and 126 are provided in the reflector 27 for irradiation facilities.

In the illustrated embodiment, the can 123 which is preferably formed of welded aluminum includes a lower hollow circular or disc shaped wall or plate 127, an upper generally disc shaped wall or plate 128, an inner tubular wall 130, and an outer tubular wall 131. The upper wall 128 includes an intermediate downwardly extending annular recess or well 124 for receiving a movable specimen rack 28. The annular recess 124 extends vertically approximately half way into the reflector 27. The walls of the annular recess 124 are formed by suitable aluminum members which are welded together and to the upper walls 128 of the can 123.

Before the parts of the can 123 are attached together, the graphite blocks 122 of the reflector 27 are placed in the can 123 in such a manner as to substantially fill the volume thereof.

The spacers for mounting the upper and lower grid plates 47 and 48 are attached respectively to the upper and lower walls 128 and 127 of the can 123.

Attached to the lower plate 127 of the can 123 are two parallel structural support members 133 such as aluminum channels (see FIGURE 1). If desired, additional cross bracing such as aluminum strips 129 may be provided between the support members 133. The ends of the support members 133 extend beyond the can 123, and on each end a leveling jack 134 is placed to position the reflector 27 in suitable relation to the bottom of the reactor tank 22. Each of these jacks 134 has a round headed base, a vertically extending threaded portion, and a hexagonal top portion. The jacks 134 are inserted into threaded holes in the lower flanges of the support members 133. The jacks 134 are locked in position by means of suitable locking devices such as nuts arranged on the threaded portion. Also attached to the ends of the support members 133 are lifting eyes (not shown) which may be used to raise and lower the reflector 27 into the reactor tank 22.

The amount, size and shape of the radiation facilities provided in the reactor will vary depending upon the requirement of the installation. It should be understood that the description herein is only to show certain preferred types of irradiation facilities that may be used with the reactor.

The radiation facilities provided within the illustrated reactor comprise a pneumatically operated "rabbit tube" 135, the movable specimen rack 28, wells 126 for the irradiation of materials having a high thermal neutron absorption cross section, and a fairly large, generally rectangular specimen can 132, which is located in the recess 125 and which is usable for irradiating objects of irregular size and shape.

The rotary specimen rack 28 is enclosed in a water-tight housing 145 and includes a plurality of spaced cups 141 which are attached to and extend below a flat, horizontally extending, rotatable ring 142. The cups 141 serve as holders for specimen containers 143 and are accessible through a delivery and removal pipe 154, extending upwardly from the housing 145. Suitable means for driving and locating the rack 28 in relation to the delivery and removal pipe 154 extend through a tube 166 which extends upwardly from the housing 145. In addition, a suitable mechanism including a hoist 207 is utilized to deliver and remove specimen containers 143 through the pipe 154 to and from the rack 28. This mechanism is more fully described in the copending application, Serial No. 744,364, filed June 25, 1958, now Patent No.

3,072,549 issued January 8, 1963, and assigned to the assignee of this application.

In order to provide heat removal from the reactor system, cooled water 23 is arranged to flow by natural circulation past the fuel elements 24. The water 23 is cooled by a cooling coil 253 located adjacent the wall of the reactor tank 22 above the reactor core 21. The cooling coil 253 is part of a common vapor compression refrigeration system utilizing Freon. The refrigeration system may include a motor-compressor assembly (not shown) for compressing the refrigerant, an air-cooled condenser (not shown), and the cooling coil or evaporator 253. The motor-compressor and condenser are well known and will not be explained.

The cooling coil 253 is sufficiently spaced above the core 21 so that the neutron and gamma flux from the reactor core 21 do not produce either appreciable activation or radiation decomposition of the Freon. Preferably, the cooling coil 253 has the general shape of a toroid having a plurality of generally circular coils arranged one above the other, and a common inlet and outlet pipe. The toroid has an internal diameter large enough that the rotary specimen rack 28, the control rods 25, the core 21, and the reflector 27 can be removed. It may be supported from the top of the reactor tank 22 by suitable hangers (not shown).

In operation, the circulation of water 23 in the reactor tank 22 is generally downward along the outer portion of the reactor tank 22 from the region of the cooling coil 253 to the bottom of the reactor tank 22 up through the reactor core 21 and thence back to the region of the cooling coil 253. The lower grid plate 48 of the core 21, as described previously, is supported by a plurality of spacers 68. This arrangement provides a passageway for the water 23 between the reflector 27 and the lower grid plate 48. In addition, water flows through the holes 59 in the lower grid plate 48. Also, as described previously, at the upper grid plate 47 the spacers 57 of the fuel elements 24 are shaped to provide passageways for the water 23.

To hold the water temperature leaving the region of the cooling coil 253 substantially constant, an automatic temperature controller or thermostat having a remote bulb (not shown) is generally provided. Preferably, the bulb is located approximately one foot below the cooling coil 253 in the stream of cooled water 23.

In the illustrated reactor the temperature controller is adjustable between about 15° C. and about 75° C., and the refrigeration system is designed for 50,000 B.t.u. per hour load.

Various reactor physics parameters may be varied within relatively wide limits in designing the above described reactor without departing from the nature and scope of the present invention. For purposes of illustration, the design specification for a 10 kilowatt reactor of the type described is set forth below.

Outer structure:
  Reactor pit, concrete lined _____ 6 ft. 6 in. I.D. x 20 ft. 9 in. deep.
  Reactor tank, aluminum _____ 6 ft. diam. x 19 ft. 8 in. deep x ½ in. thick.

Core geometry: A cylindrical array of 56 aluminum clad fuel elements, 3 control rods, 30 dummy (graphite) fuel elements and 2 irradiation facilities, arranged in concentric circles as follows—

| | Diameter, inches | Uniformly spaced holes | | |
|---|---|---|---|---|
| Center | | 1 | 1 | irradiation facility. |
| 1st circle | 3.2 | 6 | 6 | fuel elements. |
| 2nd circle | 6.3 | 12 | 12 | Do. |
| 3rd circle | 9.4 | 13 | 15 | fuel elements, 3 control rods. |
| 4th circle | 12.5 | 24 | 23 | fuel elements, 1 dummy fuel element. |
| 5th circle | 15.6 | 30 | 29 | dummy fuel elements, 1 irradiation facility. |

Fuel element specification:
  Diameter _____ 1.42 in.
  Length of active portion _____ 14.0 in.
  Aluminum cladding thickness _____ .030 in.
  Weight of active portion _____ 2250 grams.
    Zirconium _____ 92% by weight.
    Uranium _____ 8% by weight.
  Uranium enrichment _____ 20% U-235.
  Hydrogen atoms/zirconium atoms _____ 1.0
  Hydrogen atoms/uranium 238 atoms _____ 50.
  Burnable poison _____ Samarium oxide-aluminum wafers (approximately 1% by weight of samarium oxide), 0.05 in. thick and 1.40 in. in diameter, located above and below the active portion of each fuel element.

Critical mass _____ Approximately 1.95 kg. of U-235.
Reflector:
  Material _____ 1.65 density graphite, aluminum clad.
  Thickness—
    Radial _____ 12 in.
    Top and bottom of fuel elements _____ 4 in.

Thermal characteristics (continuous operation):
  Power _____ 10 kw.
  Cooling method _____ Water circulated by natural convection.
  Refrigeration capacity _____ 7½ tons.
  Cooling coil—
    Number of coils _____ 26.
    Dimensions of the tube forming the coil _____ 1⅝ in. O.D. x 0.065 in. wall.
    Diameter of coil—
      Inner spiral _____ 5 ft.
      Outer spiral _____ 5 ft. 6 in.
    Location of the lowermost turns of the coil _____ 4 ft. above the core.
  Water temperature—
    Core inlet _____ 30° C.
    Core outlet _____ 38° C.
  Coolant flow rate _____ 13 g.p.m.
  Coolant average velocity in core _____ 0.05 ft./sec.

The reactor can be operated intermittently at powers up to 30 kw.
Water volume in the core _____ Approximately 35 percent.
Aluminum in the core _____ Approximately 8 percent.

Control:
  Boron carbide control rods _____ 3.
  Drives _____ Winch type.
  Maximum withdrawal rate _____ 6 in./min. (15.2 cm./min.).

Shielding:
  Material _____ 16 ft. of water over core.
  General radiation level above water (at kw. power) _____ less than 0.25 mrem./hr.

This reactor has a neutron flux of about $.7 \times 10^{11}$ neutrons per square centimeter per second at 10 kw. at the specimen rack located in the reflector and an average core neutron flux of about $1.0 \times 10^{11}$ neutrons per square centimeter per second. The neutron flux at the center of the core is about $1.5 \times 10^{11}$ neutrons per square centimeter per second.

The excess reactivity of the reactor is about 0.5% and the prompt negative temperature coefficient of reactivity is about $7 \times 10^{-5}/°$ C. The large negative temperature coefficient of reactivity results from a "fuel element expansion" contribution of about $2.0 \times 10^{-5}/°$ C., a "warm neutron" contribution of about $1 \times 10^{-5}/°$ C., a "leakage" contribution of about $2 \times 10^{-5}/°$ C., and a "neutron Doppler" contribution of about $2 \times 10^{-5}/°$ C. A temperature increase of about 60° C. will therefore produce a drop in reactivity of about .004. Thus, if 0.4% excess reactivity is suddenly added to this reactor the temperature of the core will rise from about 34° C. to about 94° C. at which point the excess reactivity added to the system will be fully counterbalanced by a corresponding drop in reactivity due to the high negative temperature coefficient. If the rate of cooling of the reactor is neglected, the temperature of the fuel will "over shoot" to approximately 150° C., at which temperature the reactor will be distinctly subcritical. In a reactor which is being cooled during the excursion, the peak temperature will of course be considerably less than 150° C.

If a greater amount of excess reactivity is added to the system, for example, if all of the available reactivity (about 0.5%) is suddenly added, the temperature of the core will rise to a value less than 240° C. In this case water will be suddenly ejected from the core in addition to the counter-balancing of the reactivity in the system. Since the fuel elements are designed to withstand a temperature of about 300° C., they will be unaffected by the sudden ejection of water from the core. Tests indicate that ejection of water from the core will not lead to damage of the reactor so long as the maximum fuel temperature does not exceed 300° C.

A further increase in the high prompt negative temperature coefficient of reactivity may be obtained in the present reactor by adding a predetermined amount of suitable "poison" to the system. The "poison" should be such that the relative absorption of neutrons by the high neutron capturing material relative to the absorption of neutrons by the fissionable material increases with the temperature of the fuel. The addition of "poisons" to the reactor results in the absorption of neutrons. This neutron loss, however, is comparable to or less than the neutron loss resulting from the presence of uranium 238 or natural leakage sufficient to produce the same temperature coefficient for the reactor. The material used as a "poison" can vary widely and may be either a material which has a constant or increasing absorption cross section up to a temperature over about 300° C., such as samarium or cadmium, or a "black poison" such as a suitable thickness of boral (a boron carbide-aluminum mixture) which is essentially opaque to neutrons. The "poison" may be added either directly to the fuel element or may be located externally of the fuel element, such as at the inner face of the reflector, as desired.

For example, in a reactor such as has just been described, "black poison" is conveniently added by adding compressed boral in the form of discs .75 in. in diameter × .05 in. in thickness at each end of the central body portion of each fuel element. This will give a total capture probability in the "poison" of around 10% and give an added contribution to the negative temperature coefficient of reactivity of about $1.0 \times 10^{-4}/°$ C. or greater. The addition of this amount of "black poison" will require an increase in critical mass of about 30% or the addition of about eighteen fuel elements to the core.

It is seen from the foregoing that a practical reactor for the efficient production of radioactive isotopes of various half-lives can be constructed in a relatively simple and inexpensive manner utilizing the earth and water as a shielding means and incorporating an improved cooling system. The reactor is operable by a small number of relatively unskilled operators, so that operating costs are minimized. Accordingly, the reactor of the present invention is suitable for use by industry and in other similar applications as set forth in the foregoing.

This application is a division of application Serial No. 744,364, filed June 25, 1958, now U.S. Patent No. 3,072,549, issued January 8, 1963, and entitled "Neutronic Reactor."

Various features of the invention are set forth in the appended claims.

We claim:

1. A neutronic reactor comprising a vertically extending reactor tank, a quantity of water which serves both as a moderator and as a coolant and occupies a major portion of the volume of said tank, a reactive core centrally disposed in the lower end of said tank above the bottom thereof for permitting passage of said water therebetween, said core including a plurality of vertically extending fuel elements supported in horizontally spaced relationship to provide passageways therebetween, a reflector enclosed within a water-tight housing extending about said reactive core, the diameter of said reflector housing being less than that of said tank so as to provide an annulus between said reflector and said tank for permitting passage of said water therebetween, a cooling coil supported in said tank above said core for cooling said water, said coil being of a diameter such that it extends adjacent the side wall of the tank and is large enough to permit passage of said reflector therethrough, the cooling of said water in said tank by said cooling coil and the heating of said water in said tank by said fuel elements during operation of said reactor causing said water to circulate by convection, said circulation being generally downwardly from said cooling coil adjacent the side wall of the tank, generally radially inwardly adjacent the lower end of the tank, generally upwardly through the passageways between said fuel elements and generally radially outwardly at said cooling coil.

2. A nuclear reactor comprising a vertically extending reactor tank having a side wall and a bottom wall, a generally cylindrical reactive core disposed in the lower end of said tank in spaced relation to the bottom wall, said core including a plurality of vertically extending fuel elements supported in horizontally spaced relationship to provide passageways therebetween, an annular reflector enclosed within a water-tight housing extending vertically between said reactive core and the side wall, the outer diameter of said reflector housing being less than that of said tank so as to provide an annulus between said reflector and said tank, a quantity of water disposed in said tank and occupying a major portion of the volume of said tank, means for providing cooling of said water at a location above said core and adjacent said side wall, the cooling of said water by said cooling providing means and the heating of said water by said core causing said water to circulate by convection and cool said fuel elements during operation of said reactor, said circulation being generally downwardly from said cooling providing means through said annulus, generally radially inwardly adjacent the bottom wall of the tank, generally upwardly through said passageways between said fuel elements, and generally radially outwardly at said cooling providing means.

References Cited in the file of this patent

UNITED STATES PATENTS

| | | |
|---|---|---|
| 2,837,476 | Busey | June 3, 1958 |
| 2,857,324 | De Boisblanc et al. | Oct. 21, 1958 |
| 2,874,106 | Hammond et al. | Feb. 17, 1959 |
| 2,917,444 | Dreffin | Dec. 15, 1959 |

OTHER REFERENCES

Nucleonics, vol. 10, No. 11, November 1952, pp. 56–60.

Atomic Energy Commission Document: NRL 4729, Naval Research Laborating Research Reactor, Part II, Reactivity Measurements on a Graphite and Water Reflected Core, Bebbs et al., May 24, 1956, pp. IV and 1–9.